United States Patent [19]

Burette

[11] Patent Number: 5,193,623
[45] Date of Patent: Mar. 16, 1993

[54] HITCHING ASSEMBLIES

[76] Inventor: John Burette, 10 Bergman St., Samford, Queensland, Australia, 4520

[21] Appl. No.: 646,767
[22] PCT Filed: Sep. 5, 1988
[86] PCT No.: PCT/AU88/00342
§ 371 Date: Jan. 16, 1991
§ 102(e) Date: Jan. 16, 1991
[87] PCT Pub. No.: WO90/02481
PCT Pub. Date: Mar. 22, 1990

[51] Int. Cl.⁵ .......................................... A01B 59/043
[52] U.S. Cl. ...................................... 172/47; 172/272; 172/439; 403/334; 403/361; 180/53.3
[58] Field of Search ................. 172/47, 249, 439, 272, 172/443, 444, 451, 776; 37/231; 280/416.2; 180/53.3; 403/334, 333, 361

[56] References Cited

U.S. PATENT DOCUMENTS

| | | | |
|---|---|---|---|
| 2,743,117 | 4/1956 | Hutchings | 172/272 |
| 3,292,949 | 12/1966 | Restall | 172/272 |
| 3,432,182 | 3/1969 | Tweedy | 172/272 |
| 3,716,253 | 2/1973 | Gniffke et al. | 172/248 |
| 4,116,283 | 9/1978 | Blessent | 172/443 |
| 4,176,727 | 12/1979 | Perin | 180/53.3 |
| 4,872,274 | 10/1989 | Giersch et al. | 403/334 |
| 4,884,639 | 12/1989 | Nozaka et al. | 172/272 |
| 4,887,680 | 12/1989 | Nozaka et al. | 180/53.3 |
| 4,917,530 | 4/1990 | Engelhardt et al. | 403/361 |
| 5,010,962 | 4/1991 | Bloom, Jr. | 37/DIG. 19 |

FOREIGN PATENT DOCUMENTS

| | | |
|---|---|---|
| 412943 | 5/1968 | Australia . |
| 454514 | 10/1974 | Australia . |
| 47684/79 | 12/1979 | Australia . |
| 40712/78 | 4/1980 | Australia . |
| 58905/80 | 7/1980 | Australia . |
| 18602/83 | 3/1984 | Australia . |
| 15166/88 | 11/1988 | Australia . |
| 21135/83 | 5/1989 | Australia . |
| 8102086 | 8/1981 | PCT Int'l Appl. . |
| 1088954 | 10/1967 | United Kingdom . |

Primary Examiner—Randolph A. Reese
Assistant Examiner—Spencer Warnick
Attorney, Agent, or Firm—Edwin D. Schindler

[57] ABSTRACT

A hitch assembly for coupling an implement to a prime mover is disclosed, which includes a first connector assembly, having a mount for mounting the first connector assembly onto the prime mover, and a second connector assembly having a mount for mounting the second connector assembly onto the implement. One or, preferably, a plurality of complementary plug and socket members is provided for the first connector assembly and the second connector assembly with the plug member(s) and the socket member(s) being disposed on the connector assemblies at an upper medial location thereof and at a lower outer location at an opposite side of the medial location. The socket member is provided with a throat portion which is disposed with its entry axis being substantially horizontal and with entry to the throat portion being bounded by an outwardly diverging lip portion. Retaining means are provided for retention of the plug member engaged within the socket member for operatively securing the connector assemblies together for hitching the implement to the prime mover. To connect the implement to the tractor, the operator may drive the tractor in reverse towards the implement, guided by a sight alignment of the socket and plug members. Because the socket members are horizontally disposed, the divergent lip portions help to guide plug members into the throat portions of the socket members should the prime mover and the implement be misaligned.

8 Claims, 2 Drawing Sheets

HITCHING ASSEMBLIES

This invention relates to improved hitching assemblies. In particular, it relates to hitching assemblies for hitching agricultural implements to tractors but of course it is to be understood that it can be used for connecting earth working machines and the like to various implements.

Conventional agricultural and/or earth working machines are provided with releasable connections or hitches for coupling the prime mover to a selected implement. For agricultural purposes the prime mover is a tractor provided with a three point linkage assembly which couples to the implements to be used, enabling the implements to be raised, lowered or tilted as required.

The three point linkage arms are normally connected to the implement to be attached to the tractor by pin connections in which respective pins are inserted through clevis mountings to pin the apertured end of each respective link to the implement. While such connections are extremely efficient and simple in use, their connection and disconnection to various implements can be a tedious and sometimes difficult operation due to the need to force the retaining pins through apertures which may not be accurately aligned.

Many attempts have been made to overcome this disadvantage by providing so called "quick hitches". Such quick hitches include adaptors which are generally fixedly secured to the prime mover and the implement and are provided with complementary connectors which can be remotely coupled to secure the implement to the prime mover. Such hitches have not gained widespread acceptance. It is believed that this is at least partly due to their unreliable operation and/or complexity which often results in mechanical failure when working in harsh environments. Furthermore, many of the so called quick hitches do not permit the implement to be connected to the prime mover without the requirement for the operator of the prime mover to leave the driving position to align components of the quick hitch or to seek assistance in the coupling operation.

The present invention aims to alleviate the above-mentioned disadvantages and to provide hitching assemblies which will be reliable and efficient in use. Other objects and advantages of this invention will hereinafter become apparent.

With the foregoing and other objects in view, this invention in one aspect resides broadly in a hitch assembly for coupling an implement to a primer mover, said hitch assembly including a first connector assembly adapted for mounting to a prime mover and a second connector assembly connectible to an implement and co-operable with said first connector assembly to fixedly secure the implement to said prime mover. Preferably the first connector assembly is in the form of a mounting frame which is adapted for adjustable connection to a prime mover by suitable linkage means. It is also preferred that the first connector assembly is provided with engagement means which engages with complementary engagement means on the second connector assembly to provide the connection therebetween.

Preferably the first connector assembly and the second connector assembly each include a similarly shaped mounting frame which may be round, square or polygonal in shape. The mounting frame may be in the form of a flat plate like member or alternatively, it may include an assembly of frame members. Suitably the mounting frame includes at least one laterally extending lower, frame member upon which there may be located suitable mountings for the attachment of said mounting frame to either a prime mover or an implement. Alternatively, the mounting frame may include two laterally extending lower frame members at opposite sides of an intermediate central frame portion.

The engagement means associated with each connector assembly may include an engagement member which engages a complementary engagement member associated with an opposing connector assembly. Preferably each connector assembly includes an upper central engagement member and a pair of laterally spaced engagement members. Each engagement member may include complementary socket and plug members and each socket member may include a tapered inlet which in use may aid in the location therein of an opposed misaligned complementary plug member. Alternatively the engagement members may be adjustable for alignment with one another. In one embodiment the plug members may be cone shaped though it will be appreciated that the plug members may be pyramidal, prismatic or any other suitable shape.

Preferably each mounting frame includes one or more mountings for the attachment of the mounting frame to either a prime mover or an implement. The mountings may be arranged adjacent respective engagement means or spaced therefrom. Furthermore, each mounting may be either integral with or adjustably mounted on said mounting frame and may include an outwardly extending arm or a pair of outwardly extending arms each having suitable attachment means associated with a respective free end thereof.

The mounting frame may also include a drive shaft support assembly may include a laterally extending frame member which preferably is hingedly or adjustably connected to said mounting frame and whereby in use, the drive shaft of either the prime mover or said implement may rest on or alternatively be supported by said drive support assembly. The drive shaft support assembly preferably also includes suitable coupling means enabling the automatic coupling together of the respective drive shafts of said prime mover and said implement.

In another aspect, this invention resides broadly in a hitch assembly for coupling an implement to a prime mover, said hitch assembly including a first connector assembly adapted for mounting to a prime mover and a second connector assembly connectible to an implement and co-operable with said first connector assembly to fixedly secure the implement to said prime mover, said hitch assembly further including complementary drive transfer assemblies mounted on respective ones of said first and second connector assembly, said transfer assemblies engaging operatively when said connector assemblies are interconnected.

On drive transfer assembly may include a plug adaptor having any suitably shaped cross-sectional configuration which may be non-circular for interlocking engagement with a complementary socket adaptor, or circular and be provided with drive dogs or the like for power transfer. The plug adaptor may mate with a drive socket adaptor on the other drive transfer assembly and for this purpose may be provided with a complementary shaped socket and a tapered inlet leading to said socket. Alternatively, flange or universal couplings or dog clutches may be used to couple together the drive and driven shafts.

In another aspect of this invention there is provided a hitch assembly for coupling an implement to a prime mover, said hitch assembly including a first connector assembly adapted for mounting to a prime mover and a second connector assembly connectible to an implement, complementary engagement means associated with each assembly for releasably connecting said assemblies together and locking means for locking said complementary engagement means in an operatively engaged relationship.

The locking means may be either manually, electrically or hydraulically operable and may draw power from the prime mover. The engagement means may include complementary plug and socket connections and the locking means preferably includes one or more retaining pins which may be inserted in communicating apertures formed in the side wall of said plug and socket connections.

In order that this invention may be more readily understood and put into practical effect, reference will now be made to the accompanying drawings which illustrates a typical embodiment of the present invention and wherein, FIG. 1 is a perspective view of one form of hitch assembly according to the present invention;

Figure 1:
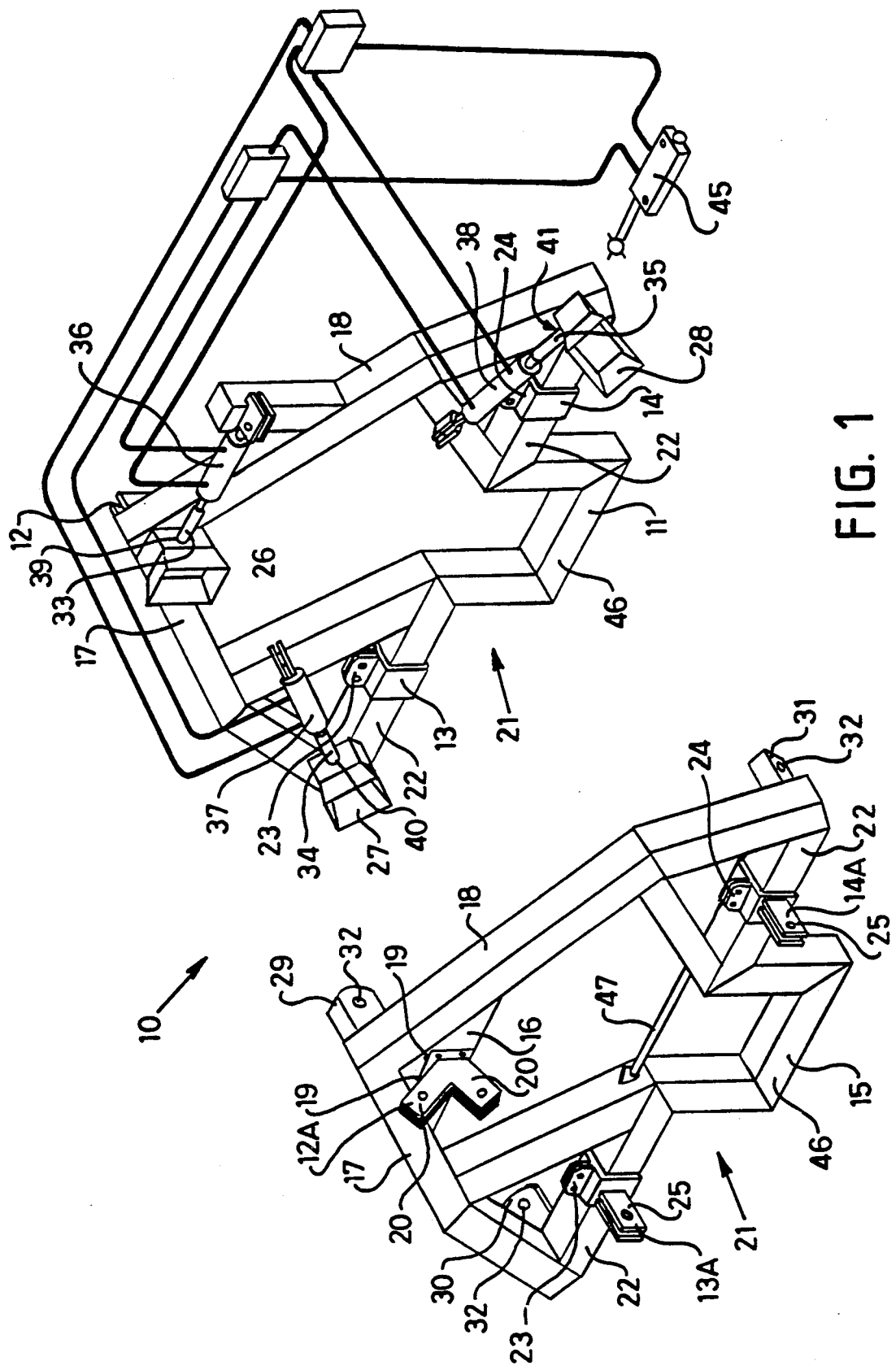
Figure 3:
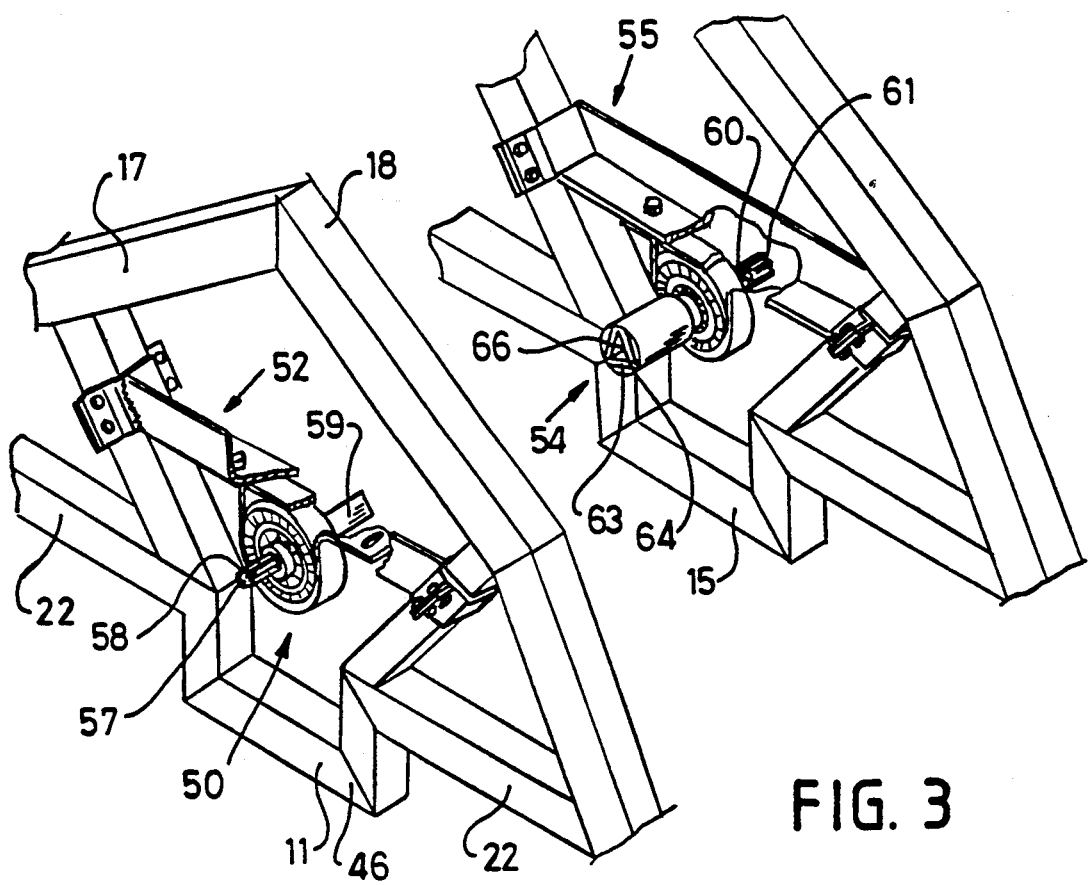
FIG. 3 illustrates one form of releasable shaft connector assembly for connecting a tractor's power take-off to an implement's drive shaft.

Referring to the drawings there is shown a hitch assembly 10 which is adapted to be interposed between the three point linkage on a tractor and an implement. The hitch assembly comprises a first mounting frame 11 adapted for connection to the three point linkage of the tractor by means of three clevis mountings 12,13, and 14 and a second mounting frame 15 which is substantially identical to the first mounting frame and is provided with similar clevis mountings 12a and 14a which connect to the standard three point linkage connections on the implement to be used.

As shown, the mounting frames 11 and 15 are substantially triangular in configuration. A vertically slotted gusset plate 16 is secured between the inclined apex frame members 17 and 18 whereby the central mountings 12 and 12a may be bolted to the frame and adjusted vertically in the mounting slots 19. As illustrated, the mountings 12 and 12a each include a pair of clevis mountings arranged in a V configuration with respective arms 20 of different lengths so that the mountings can be installed with either arm 20 uppermost to provide further adjustment.

The lower frame portion 21 includes opposed lower frame members 22 upon which the lower clevis mountings 13 and 13a and 14 and 14a are slidably mounted by bolted flange connections 23 and 24. This permits the width between respective clevis mountings 13 and 14 and 13a and 14a to be adjusted to suit a particular implement. Furthermore, it will be seen that the clevis lugs 25 of the clevis mountings 13 and 13a and 14 and 14a are mounted in offset relationship on the flange connectors whereby further adjustment may be provided by either reversing the clevis mounting orientations on the lower frame members or swapping them from one lower frame member to the other.

The first mounting frame 11 is provided with three socket connectors 26,27 and 28 arranged adjacent and in opposition to the respective clevis mountings 12,13 and 14. Complementary plug connectors 29,30 and 31 are mounted on the second mounting frame 15 whereby the latter and the first mounting frame 11 may be secured together by engagement of the plug connectors 29,30 and 31 within the complementary socket connectors 26,27 and 28.

It will be seen that the plug connectors 29,30 and 31 are apertured at 32 for engagement by respective retaining pins 33,34 and 35 mounted on the ends of hydraulic rams 36,37 and 38 whereby they may be advanced through apertures 39,40 and 41 in a side wall of the respective sockets. The stroke of the rams is such that at full extension the pins 33,34 and 35 approach the opposing side walls of the socket. The pins pass through the apertures 32 when the plug connectors are engaged in the socket connectors in their fully engaged positions. A control valve 45 for actuating the rams 36, 37 and 38 is supported adjacent the driving position on the tractor so that the respective mounting frames can be locked together and unlocked from the driving position.

The mounting frames 11 and 15 each include a lower frame portion 21 having a central U-shaped frame portion 46 which provides clearance for the drive shaft of the tractor's power take-off assembly and the driven shaft of the implement. The second mounting frame 15 is provided with a hinged bar 47 which may be pivoted to a position across the open mouth of the U-shaped frame portion 46 on that mounting frame 15 to provide a rest for the driven shaft of the implement whereby a tractor may be reversed unhindered towards the implement.

In use, when the tractor mounting frame 11 is secured to a tractor and the implement mounting frame 15 is secured to an implement, the operator will simply reverse the tractor to the implement, guided by sight alignment of the respective plug and socket connectors. Once these are partially engaged, the three point linkage may be adjusted to enable the plug and socket connectors to be moved to their fully engaged positions. The control valve 45 may then be actuated to force the pins 33,34 and 35 through the sockets and the engaged plug. This action will lock the two frames together so that the operator can now drive away with the implement firmly attached to the tractor. The implement may be disengaged from the tractor after the implement is lowered to the ground by actuating the control valve to retract the pins 33 to 35 and the driving away to separate the complementary plug and socket connectors.

Figure 2:
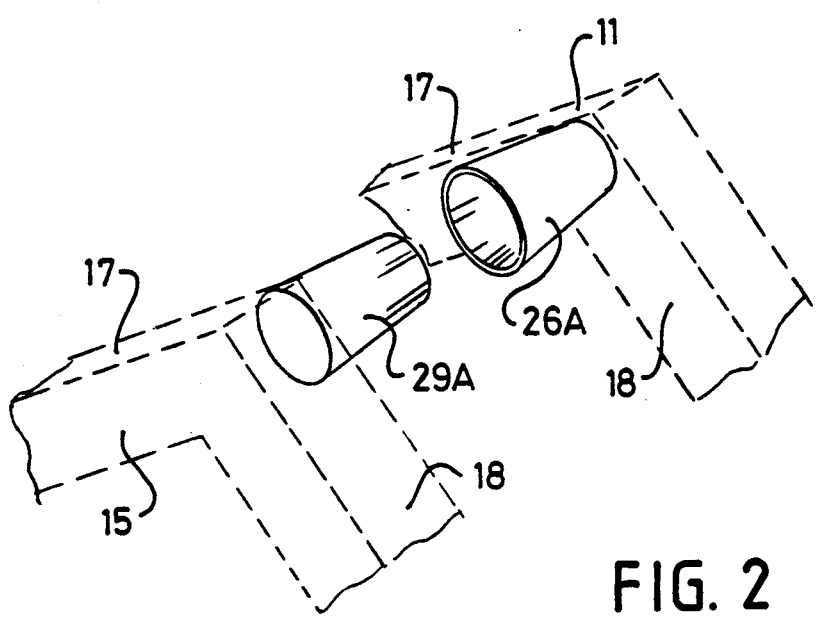
FIG. 2 illustrates alternate forms of complementary engagement means.

As the clevis mountings for the three point linkage and the implements are formed as bolt on mountings, they may be readily adjusted to suit the particular linkage or implement and of course they may be readily modified or replaced if not suitable. In the preferred form of the invention the socket and plug connectors 26 and 29 are in the form of cone shaped members 26a and 29a as illustrated in FIG. 2.

The hitch assembly may be provided with automatic coupling means for coupling the implement's driven shaft to the power take-off. For this purpose the first mounting frame 11 is provided with a plug adaptor assembly 50 resiliently mounted to the frame 11 by a resilient mounting 52 and the second mounting frame 15 is provided with a socket adaptor assembly 54 resiliently mounted to the frame 15 by a further and substantially identical resilient mounting 55. The plug adaptor 50 includes a stub shaft 57 having a forwardly extending splined end 58 for connection to the power take-off and a triangular sectioned end 59, while the socket adaptor 54 includes a stub shaft 60 having a rearwardly extending splined socket end 61 corresponding to the splined socket end of the implement driven shaft socket and a triangular sectioned socket end 63 within which the rearwardly facing shaft end 59 may engage.

The recess 64 in the socket end 63 is triangular to match the triangular cross-sectional configuration of the plug end 59 and its outer end is provided with a triangularly tapered lead-in 66 which in use will accommodate small misalignments between the stub shafts 57 and 60 and cause relative rotation between the plug and socket ends during initial engagement until the plug adaptor 50 is operatively aligned with the socket adaptor 54 whereupon it may be fully engaged in a driving relationship. This connection may be achieved automatically at the same time the socket and plug connectors 26 and 29 respectively are engaged.

For this purpose, the splined end 58 is permanently connected to the power take-off while the first mounting frame 11 is mounted to the tractor and the splined socket end 61 is permanently mounted to the implement's driven shaft. The resilient mountings 52 and 55 permit free rotation of the respective stub-shafts as well as the resilience for accommodating misalignments during connection and disconnection of the mounting frames 11 and 15. Furthermore the inwardly facing stub-shaft ends are spaced so that they remain distant from one another during initial engagement between the socket and plug connectors 26 to 31 and engage after substantial alignment is maintained by the connectors 26 to 31.

It will of course be realized that the above has been given only by way of an illustrative embodiment of the invention and that all such and other modifications and variations thereto as would be apparent to persons skilled in the art are deemed to fall within the broad scope and ambit of this invention as is defined in the appended claims.

The claims defining this invention are as follows:

I claim:

1. A hitch assembly for coupling an implement to a prime mover, said hitch assembly comprising:
    a first connector assembly having mounting means for mounting the first connector assembly on the prime mover;
    a second connector assembly having mounting means for mounting the second connector assembly on the implement;
    socket members disposed on one connector assembly at an upper medial location thereof and at lower outer locations at opposite sides of said medial location;
    plug members disposed on the other said connector assembly at an upper medial location thereof and at lower outer locations at opposite sides of said medial location, said socket members and said plug members being complementary; and,
    retaining means for operatively securing said connector assemblies together for hitching the implement to the prime mover, characterized in that:
        said mounting means on said first connector assembly or on said second connector assembly includes a height adjustable, upper medial mounting means and two laterally adjustable, lower mounting means;
        said socket members include a conical shaped throat portion having a substantially horizontal entry axis;
        said plug members being conical in shape; and,
        said retaining means for retaining said plug members engaged in said socket members.

2. The hitch assembly as claimed in claim 1, wherein said plug members and said socket members are apertured so that the apertures therein align when said plug members are operatively engaged in said socket members and said retaining means includes locking pins for insertion through said aligned apertures.

3. The hitch assembly as claimed in claim 1, wherein said first connector assembly and said second connector assembly are respective mounting frames and wherein said mounting means are disposed adjacent respective plug members and said socket members for connection to respective complementary mountings on the prime mover and the implement.

4. The hitch assembly as claimed in claim 1, wherein said mounting means on said first connector assembly or on said second connector assembly includes said upper medial mounting means releasably mounted on said respective mounting frame, said upper medial mounting means comprising a pair of clevis mountings arranged in a V-configuration and having arms of different lengths.

5. The hitch assembly as claimed in claim 4, wherein said mounting frames are each provided with a laterally extending lower frame member along which there is mounted said two lower mounting means.

6. The hitch assembly as claimed in claim 5, wherein each said lower frame member extends inwardly from the lower outer locations of said socket members or said plug members and each said mounting frame further includes inclined frame members which extend inwardly and upwardly from the outer ends of each said lower frame member to said upper medial mounting means.

7. The hitch assembly as claimed in claim 6, wherein each said connector assembly includes a drive transfer assembly having releasable connection means for connection to a respective drive shaft on the implement and on the prime mover and wherein the drive transfer assemblies are operatively engageable.

8. The hitch assembly as claimed in claim 7, wherein respective said drive transfer assemblies include a drive plug adaptor and a complementary drive socket adaptor.

* * * * *